Patented Dec. 24, 1940

2,225,661

UNITED STATES PATENT OFFICE 2,225,661

HIGHER MOLECULAR WEIGHT ISOCYANIC ACID ESTERS

Erik Schirm, Dessau in Anhalt, Germany, assignor, by mesne assignments, to Heberlein Patent Corporation, New York, N. Y., a corporation of New York No Drawing. Application October 14, 1937, Serial No. 168,903. In Germany October 19, 1936

4 Claims. (Cl. 260—453)

This invention relates to iso-cyanic acid esters of certain higher molecular aromatic amine compounds.

Among the objects of the invention is the production of a series of compounds adapted to render textiles and other materials water repellent. Another object is to provide textile materials and fabrics which are substantially water proof and still possess other highly desirable properties.

The compounds of the present invention may be referred to broadly as iso-cyanic acid esters of higher molecular aromatic amine compounds of the general formula R—X—Y—R'—NH$_2$ wherein R is a higher molecular hydrocarbon radical of at least 12 carbon atoms which is preferably an aliphatic or a cyclo aliphatic hydrocarbon radical, X is an optional component which may be omitted and which may be an —N(H)-group or a substituted amino group as —N(R'')— wherein R'' is a hydrocarbon radical of any desired molecular weight, Y is a negative bivalent-atom group preferably the CO group or the SO$_2$ group and R' is an aromatic radical. This R' aromatic radical may, optionally, be substituted by other atoms or radicals providing they are of a nature which do not react with the iso-cyanic group, examples of suitable substituting radicals being alkyl groups of low molecular weight.

The iso-cyanic acid esters of the present invention may be satisfactorily produced from any number of aromatic amines, several examples of which are as follows:

1. p-Amino-phenyl-pentadecyl ketone
2. 1-amino-naphthalene-6-cetyl sulfone
3. 1-amino-naphthalene-7-cetyl sulfone
4. m-Amino-benzoic acid montanyl ester (obtained by esterification of m-amino benzoic acid with montanyl alcohol received by reduction of montanic acid).
5. 5-amino-2-naphthoic acid methyl octadecyl amide
6. Metanilic acid dicetyl amide The above mentioned amines may be converted into the iso-cyanic acid esters of the invention in accordance with processes already known in the art, the preferred method being through the treatment of suitable salts of the amines in the presence of an inert diluent, and heating together with phosgene.

The aromatic iso-cyanic acid esters herein described may be successfully used in rendering materials water repellent in almost every stage of the various processes whereby the textiles are produced. All kinds of materials may be treated, such for example as cotton, wool and artificial textile fabrics, which may be obtained from regenerated cellulose or cellulose derivatives in the form of floss, threads, skeins, fabrics and the like.

The esters are applied to the above mentioned materials by dissolving the esters in an inert organic solvent, applying the resulting solution to the fiber or textile, and then evaporating off the solvent by heating to a temperature between about 100 and 200° C. This process which is also considered within the scope of the present invention causes the novel ester compounds to chemically combine with the fiber substance treated.

The treatment of other substances than those above mentioned is also considered within the scope of the present invention, such substances being, for example, films, foils, plates, ribbons and tubes produced from regenerated cellulose and cellulose derivatives. Albuminous substances and their decomposition products, such as gelatine, as well as objects formed from these materials, and the like may also be rendered water repellent, in which case, however, these materials may also contain other substances of the nature of diluents, fillers and the like.

An examination of the structure of the aromatic iso-cyanic acid esters of the present invention reveals that a higher molecular hydrocarbon radical which may have from 12 to about 30 carbon atoms, is joined on to the molecule by means of a negative group attached directly to the aromatic nucleus. These compounds have several distinguishing characteristics which probably may be traced to the specific attachment of the negative radical with the aromatic nucleus. One of them is their capability of being formed with considerable ease from aromatic amino compounds. Another characteristic is their capability of modification and conversion by reaction with other agents whereby products of differing characteristics and quality may be very quickly produced. In these characteristics the compounds of the present invention are quite different from the aromatic iso-cyanic acid esters of the prior art wherein the higher molecular hydrocarbon radical is joined directly to the aromatic nucleus or through an oxygen atom, a nitrogen atom, or a sulphur atom. These prior compounds are formed with considerable difficulty. In addition, they possess a lower reactivity. The compounds of the present invention have the advantage that a second higher molecular hydrocarbon radical may be introduced into the molecule by attachment to the nitrogen atom forming the group —N(R'')—. This second hydrocarbon radical frequently causes a remarkable increase in the effectiveness of the treatment and produces textile materials and the like which are considerably more water repellent.

Another advantage of the compounds of the colorless or at least only slightly colored, and therefore may be applied in the textile field with superior results, many of the prior agents used present invention lies in the fact that they are for the instant purposes being dark in color.

Example 1

395 parts by weight of α-stearonaphtone are dissolved in 400 parts of concentrated sulphuric acid. The resulting solution is then cooled to 0° C. and mixed with 70 parts of nitric acid (specific weight of 1.52) and with three times the quantity of sulphuric acid, the latter being introduced at from 0 to 5° C. The resulting mass is then stirred briefly and poured on to ice, the resulting nitro compound then being filtered from the liquid present. The nitro compound is then washed with water and is next dissolved in 4000 parts of alcohol. 400 parts by weight of 38% hydrochloric acid is added to the alcoholic solution and then after heating to a temperature of 60 to 70° C., iron powder is carefully introduced in small portions until the liquid loses its color and the addition of more iron no longer causes a perceptible reaction. Next, a concentrated aqueous solution of potassium carbonate is added until the solution becomes distinctly alkaline to litmus. The iron compound is now filtered off while the mass is still warm. The said compound is then extracted with hot alcohol after which the alcoholic solution is diluted with many times its volume of water. Thereupon a precipitate is formed comprising amino-stearonaphtone. The excess liquid is then sucked off and the precipitate is then washed and dried. The amino-stearonaphtone mixture is then dissolved in 4 to 5 times its volume of boiling toluene, after which hydrogenchloride gas is introduced until the chlorohydrate derivative is formed. Then until the evolution of hydrochloric acid ceases, the phosgene gas is introduced into the solution during boiling in a reflux condenser. Next the remainder of the hydrogenchloride gas is driven off and as well the excess of phosgene by introducing dry carbondioxide. In this manner a solution is obtained which after proper dilution with an optional inert volatile solvent is excellent for rendering textile materials water repellent.

Example 2

One mol of acetanilide and one mol of naphthenic acid chloride are dissolved in carbon disulfide (the naphthenic acid chloride may be prepared in any customary manner from naphthenic acid having a boiling point of from 200 to 210° C.). Then 1⅓ mols of powdered anhydrous aluminum chloride is added in small portions to this solution during cooling and stirring. When the addition is complete the mixture is heated slightly until the evolution of hydrogenchloride ceases. The mass is then cooled with ice and compounded with concentrated hydrochloric acid. Next the carbon disulfide is dispelled through the use of water vapor. For a period of two hours the solution containing the precipitated p-acetamine-naphtheno-phenone is boiled under reflux condensation with a mixture of two parts of 38% hydrochloric acid solution and three parts of alcohol. Thereafter the alcohol is distilled off and the p-amino-naphtheno-phenone-chlorohydrate which has been precipitated and dried is suspended in five times the quantity of per-chlorethylene after which the mixture is heated to 100° C., and treated with phosgene gas until the amine is converted into the iso-cyanate. The solution is freed from dissolved gases by means of a dry air current. The solution obtained can be employed as a stock solution for the preparation of impregnating liquids or agents in accordance with the disclosure in Example 1.

Example 3

221 parts by weight of p-acetyl-amino-benzol sulphinic acid in the form of its sodium salt together with 345 parts of n-docosyl chloride, 10 parts of sodium iodide and 1200 parts of alcohol are boiled under reflux condensation for a period of from 12 to 18 hours until the oil which rises to the surface of the alcoholic solution has disappeared and no further quantity of sodium chloride separates during the continued boiling. The duration of the reaction can be shortened somewhat by operating under pressure or by using butanol as a solvent. The alcohol is then distilled off and the residue is mixed with water. From this salt solution the p-acetamino-phenol-docosyl-sulphone obtained is separated and is dissolved in alcohol. Next fuming hydrochloric acid is added to form a 15% aqueous-alcoholic hydrochloric acid solution. This solution is then boiled under reflux until the acetyl group is separated. Finally, the reaction mixture may be treated in accordance with the disclosure of Example 2 for the preparation of the iso-cyanate solution.

Example 4

A quantity of p-amino-benzoic acid octa-decyl ester chlorohydrate which may be obtained by esterification of p-amino benzoic acid with octa decyl alcohol by means of hydrogen chloride is suspended in six times the quantity of mono-chlorobenzol and the mixture heated to 100 to 110° C. Phosgene is then introduced into the mixture until hydrogen chloride gas is no longer formed. After cooling a dry air current is introduced to dispel the gases dissolved in the reaction mixture. Finally, a stock solution is obtained in the manner described in the preceding examples which is satisfactory for use in impregnating textile fabrics and other materials.

Example 5

317 parts of cetyl aniline are dissolved in 1500 parts of pyridine during stirring, 185.5 parts by weight of o-nitro-benzoyl chloride are added and after some time 360 parts of glacial acetic acid are added thereto. The mixture is then heated to a temperature of 70 to 80° C., after which zinc dust is introduced in small portions unil further conditions remain unaffected and cause no additional heating. The solution is then filtered while hot from the zinc and is poured into several times its volume of water, after which the precipitated o-amino-benzoyl-phenyl-cetyl-amine is separated from the aqueous liquid. It is then dried and dissolved in solvent naphtha-1. Hydrogen chloride gas is then introduced until the chloro hydrate is formed. Next the mass is heated to 100° C., and phosgene gas is introduced until the formation of the iso-cyanate is completed. The preparation of the compound may be completed in accordance with the procedure described in the preceding examples.

Example 6

One mol of a mixture of secondary amines, such as can be obtained by the catalytic reduction of a commercial mixture of palmitic acid amide and stearic acid amide, or by conversion of a commercial mixture of cetyl chloride and octa-decyl chloride with ammonia, is dissolved in five times the quantity of pyridine. Then one mol of m-nitro-benzoyl chloride is gradually added thereto, and after some time six mols of glacial acetic acid are added. The nitrogen dialkylated m-nitrobenzamide is converted into the amino compound and the amino compound is transformed into the corresponding iso-cyanate in the same manner as described in the preceding examples.

Example 7

Three hundred and eleven parts of dodecyl-beta-naphthyl amine are dissolved in 1500 parts of pyridine, and then 220 parts of 2-chlor-5-nitrobenzoyl chloride are added during stirring. After the addition of 360 parts of glacial acetic acid, the process is continued in the same manner as described in Example 5.

Example 8

Three hundred and fifty-one and five-tenths parts of octadecyl-cyclohexyl amine are dissolved in 3500 parts of benzol. The solution is then cooled to 0° C., after which 375 parts of a 16% solution of caustic soda are added. Next, a benzene solution of 250 parts of 2-nitro-toluene-4-sulfo-chloride are introduced at a temperature of 0 to 5° C. during stirring and cooling. The mass is then stirred for an additional hour at the same temperature and is then brought to room temperature. Next, the aqueous brine is separated, the said brine being strongly alkaline in character. The benzol is then dispelled from the solution through the use of water vapor. The residue, which consists of 3-nitro-4-methyl-benzol-sulfone-octadecyl-cyclohexyl-amide, is produced through condensation. This compound is then reduced while in an alcoholic solution of hydrochloric acid according to the directions of Example 1 with iron, thereby forming the corresponding amino compound. The amino compound, likewise as described in Example 1, is made into a toluene solution of the iso-cyanic acid ester.

Example 9

Seven hundred and seven parts of di-dodecyl amine are dissolved in 3000 parts of benzol at a temperature of 30° C. Into this solution 234 parts of p-acetamino-benzol-sulphochloride are introduced at a temperature of 30 to 40° C. The mixture is then heated for an additional 30 minutes to a temperature of 50° C., after which the solution no longer reacts alkaline toward litmus. If necessary, the solution may be neutralized by the introduction of hydrogen chloride gas. The benzol in the solution is then removed by the introduction of water vapor. Upon separation from the aqueous liquid, the residue, which is oily when heated and becomes semi-solid when cooled, is stirred with 5000 parts of benzine having a boiling point of 80 to 90° C. The residue is then filtered from the di-dodecyl amine chlorhydrate which remains undissolved. This material is then evaporated until the same becomes dry. The colorless syrupy residue is then boiled with 1500 parts of 5% alcoholic potassium hydroxide solution for thirty minutes under reflux condensation, the result being that the acetyl group is separated. The excess alkali present is then carefully neutralized with hydrochloric acid. The alcohol is then distilled off and the residue is washed with water. It is then dissolved in five times the quantity of toluene and dried by filtration over dry common salt and anhydrous magnesium sulfate. The resulting product is then further treated in the manner described in Example 1 to produce the chlorhydrate and finally the iso-cyanate.

Example 10

One thousand five hundred parts of benzol are added to 303.5 parts of tetradecyl-benzyl amine, which is easily obtainable from tetradecyl amine and benzyl chloride or tetradecyl chloride and benzylamine. Next, 400 parts of a 16% solution of caustic soda are added to the resulting solution. Next, 300 parts of 1-nitro-naphthalene-5-sulfochloride in benzene solution are gradually added during cooling with ice and energetic stirring, the temperature not being allowed to exceed 5° C. The resulting mass is stirred during cooling with ice until the conversion is complete, the mass obtained being further treated in accordance with the procedure described in Example 8.

In the foregoing examples, the proportions given are by weight.

It should be understood that the present invention is not limited to the specific examples given but that it extends to all equivalent substances and materials within the scope of the claims appended hereto.

I claim:

1. An iso-cyanic acid ester having the general formula R.CO.R'.N=C=O wherein R is a higher molecular hydrocarbon radical of at least 12 carbon atoms and R' is an aromatic group.

2. An aliphatic keto aromatic iso-cyanic acid ester containing an aliphatic hydrocarbon radical which has at least twelve carbon atoms.

3. Alkyl keto phenol iso-cyanic acid ester, the alkyl radical having from 12 to about 30 carbon atoms.

4. As a new compound, an aliphatic-aromatic isocyanate having the general formula

R—X—Y—R'—N=C=O wherein R is a higher molecular hydrocarbon radical of at least 12 carbon atoms; X is one of the following group: N(H)—, —N(R'')— in which R'' is a hydrocarbon radical; Y is CO, and R' is an aromatic group.

ERIK SCHIRM.

CERTIFICATE OF CORRECTION.

Patent No. 2,225,661.   December 24, 1940.

ERIK SCHIRM.

It is hereby certified that error appears in the printed specification of the above numbered patent requiring correction as follows: Page 2, first column, line 12, strike out the words "present invention lies in the fact that they are" and insert the same before "colorless" in line 9; line 17, Example 1, for "400 parts" read --4000 parts--; page 3, first column, line 23, Example 7, for "elevent" read --eleven--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.